Figure 1:
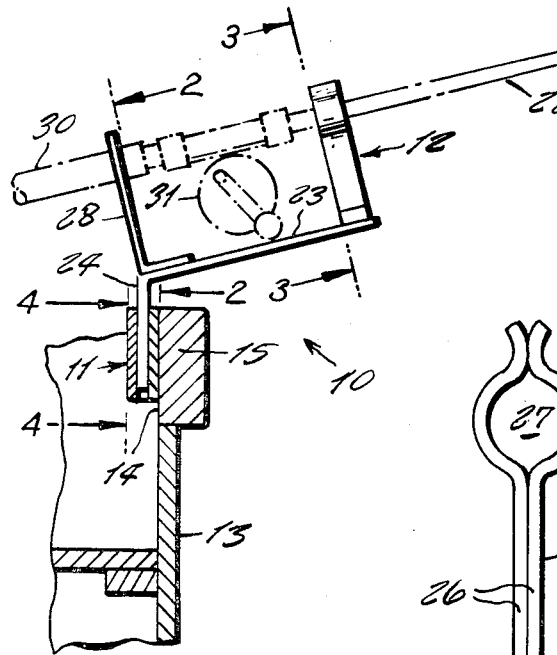

United States Patent

Nelson et al.

[15] 3,704,000
[45] Nov. 28, 1972

[54] FISHING ROD HOLDER

[72] Inventors: Elmer F. Nelson; Olive Nelson, both of 155 W. 4th South, Provo, Utah

[22] Filed: Oct. 28, 1970

[21] Appl. No.: 84,574

[52] U.S. Cl.....................................248/42, 248/224
[51] Int. Cl................................................A01k 97/10
[58] Field of Search........248/38, 39, 40, 42, 43, 188, 248/224; 287/20

[56] References Cited

UNITED STATES PATENTS

| D136,856 | 12/1943 | Olowecki.................248/42 |
| 816,097 | 3/1906 | Hunter.....................287/20 R |
| 923,596 | 6/1909 | Staples.....................248/40 |
| 1,435,085 | 11/1922 | Schumacher..............248/38 |
| 3,089,674 | 5/1963 | Bastie.......................248/40 |
| 3,226,066 | 12/1965 | Folb..........................248/40 |
| 3,306,560 | 2/1967 | Wheeler....................248/42 |

FOREIGN PATENTS OR APPLICATIONS 128,750 7/1950 Sweden....................248/188

Primary Examiner—William H. Schultz
Attorney—B. Deon Criddle and M. Reid Russell

[57] ABSTRACT

A device for readily supporting a fishing rod outwardly of a boat so to allow free movement of a fisherman in the boat, the device including a mounting bracket fixedly securable to the boat, the mounting bracket removably receiving a pole holder upon which the fishing pole is placed.

3 Claims, 8 Drawing Figures

PATENTED NOV 28 1972 3,704,000

INVENTORS.
ELMER F. NELSON
OLIVE NELSON

FISHING ROD HOLDER

This invention relates generally to fishing rod holders such as are used by sports fishermen.

It is generally well known that when several fishermen are fishing from a small boat, there is small space aboard for fishermen to move about freely, particularly if any of the fishing rods are resting inboard where they are subject to being stepped upon or broken. This situation is, of course, objectionable and in want of improvement.

Accordingly it is the principal purpose of the present invention to provide a rod and reel saver which has self-contained means for preventing fishing rods becoming broken while a fisherman is moving about within a limited space in a small boat.

Another object of the present invention is to provide a rod and reel saver wherein the fishing rod in use or not in use are positioned to extend overboard where they are out of the way, thereby permitting a fisherman to freely move about within the limited space of a small boat.

Another object of the present invention is to provide a rod and reel saver which can be installed at any desired location upon a small boat such as on the sides of a gunwale, upon the top of the gunwale, upon the transom or any other desired location.

Other objects of the present invention are to provide a rod and reel saver which is simple in design, inexpensive to manufacture, rugged in construction, easy to use and efficient in operation.

Figure 3:
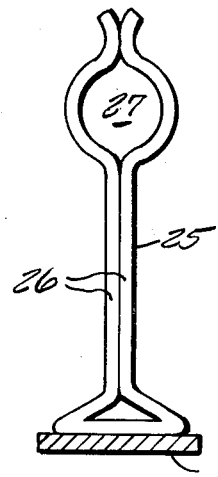
Figure 2:
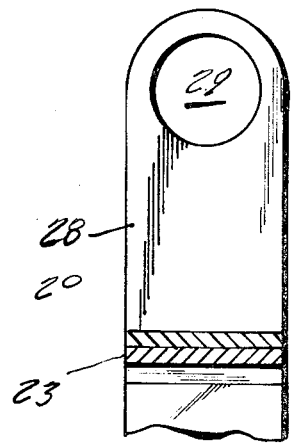
Figures 5, 7:
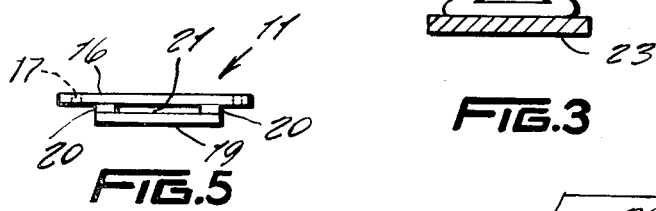
Figure 6:
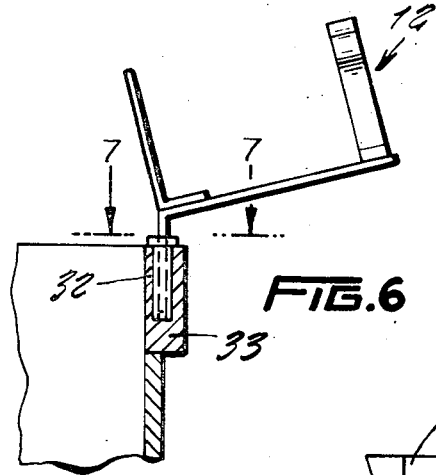
Figure 8:
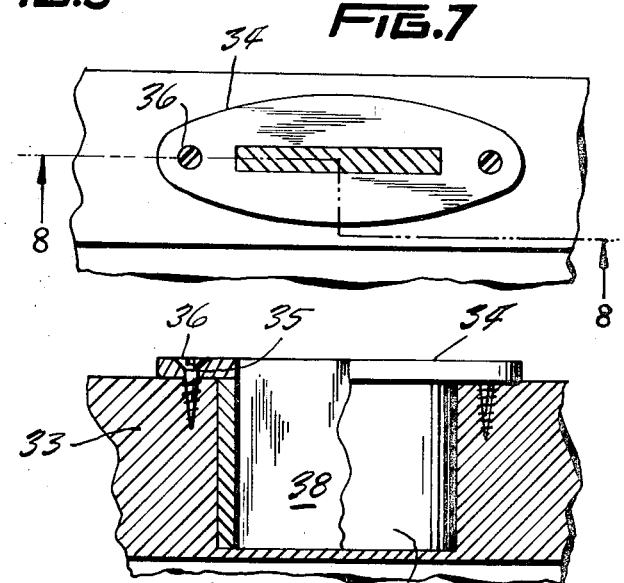
Figure 4:
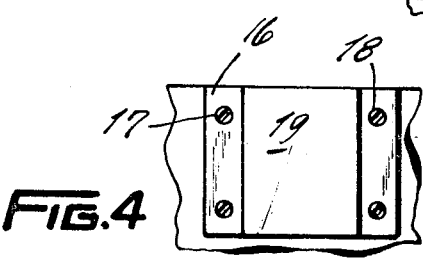

These and other objects will be readily evident upon a study of the following specification and the accompanying drawing wherein:

FIG. 1 is a side elevation view of the present invention shown partly in cross section and mounted to the inner side of a boat gunwale, FIG. 2 is an enlarged cross-sectional view taken along the line 2—2 of FIG. 1, FIG. 3 is an enlarged cross-sectional view taken along line 3—3 of FIG. 1, FIG. 4 is a slightly enlarged elevation view taken along line 4—4 of FIG. 1, FIG. 5 is a top plan view of a mounting bracket comprising a component of the present invention, FIG. 6 is a side elevation view showing a modified form of the present invention and illustrated mounted within a top of a boat gunwale, FIG. 7 is an enlarged cross-sectional view taken on the lines 7—7 of FIG. 6, and FIG. 8 is a cross-sectional view taken along line 8—8 of FIG. 7.

Referring now to the drawing in detail, the reference numeral 10 represents a rod and reel saver according to the present invention wherein there is shown in FIGS. 1 to 5, one form of the invention wherein there is a mounting bracket member and a pole holder member 12 which is removably supported within the mounting bracket 11.

The mounting bracket 11 can be mounted at any desired location upon a boat 13, such as on the inner side 14 of a boat gunwale 15 as shown in FIG. 1. Alternately it may be mounted upon the top side of the gunwale or it may be mounted upon a transom as desired.

In a preferred form, several of the mounting brackets may be mounted at different locations around the boat so that they selectively may be used depending upon where the fisherman is seated in the boat, at the particular time.

The mounting bracket includes a flat rectangular base plate 16 with mounting openings 17 therethrough for a purpose of receiving mounting screws 18 (FIG. 4) so to secure the mounting bracket to the boat.

A front plate 19 of rectangular configuration is positioned forwardly of the base plate 16 and is spaced therefrom by means of spacers 20 on opposite side edges so to form a pocket 21 between the front plate and base plate, the pocket accordingly being opened at the top so as to receive the pole holder 12 there within.

The mounting bracket is made preferably of metal so as to be strong.

The pole holder member 12 is designed for supporting a conventional fishing rod 22, as shown in FIG. 1. The pole holder includes an angularly bent, generally L-shaped base plate 23 which at its forward end is slightly upwardly tilted when a vertical leg 24 thereof is removably fitted into the pocket 21 of the mounting bracket.

Upon the forward end of the base plate 23 there is affixed a spring clip 25 made of spring steel or the equivalent and which includes opposite ends thereof bent over to form parallel adjacent legs 26 which near their terminal ends are outwardly and oppositely arched so as to form a circular opening 27 therebetween that will fit around the body of the rod 22.

The terminal ends of the legs are then brought together as shown in FIG. 3.

The spring clip is secured to the base plate by means of welding or any other securement means. At the rear end of the horizontal portion of the base plate there is affixed stationarily an outward extending L-configurated bracket 28 having a circular opening 29 near the upper end thereof and through which the handle 30 of the rod 22 can protrude.

As shown in FIG. 1 of the drawing, it is to be noted that the rod is sufficiently high above the base plate so as to provide room for a reel 31.

It is now evident that in use a fisherman can quickly and easily remove a pole holder and relocate it within another mounting bracket at another position upon the boat, and wherein accordingly the rod can be extended outwardly from the boat and over the water where it is out of the way from a fisherman bumping there against or stepping there upon while moving about within a limited space of a small boat.

In FIGS. 6 through 9, a modified design of rod saver shows a mounting bracket 32 which is imbedded within the interior of a boat gunwale 33 so that the pocket opening of the mounting bracket is located upon the top of the boat gunwale.

The mounting bracket 32 includes a top plate 34 with openings 35 therethrough for receiving mounting screws 36 receivable within the upper side of the gunwale 33.

The top plate 34 is welded or otherwise positioned over the vertically extending side portion 37 forming the bracket around the central pocket 38.

Thus there is formed a modified mounting bracket and which is equally adaptable for receiving the pole holder 12 above described.

What I now claim is:

1. A fishing pole holder comprising
   a mounting bracket adapted to be connected to the gunwale of a small boat;
   said bracket including
      a flat base plate
      a front plate
      spacers rigidly interconnecting said plates at side edges thereof, whereby a flat central pocket is formed between said plates and
      means for connecting said bracket to said gunwale; and
   a pole holder adapted to be removably held by the mounting bracket,
   said pole holder including
      a generally angle shaped base plate with a rear end thereof forming a flat vertical leg receivable within the pocket,
      an upwardly extending spring clip secured to a forward end thereof, said clip being adaptable to grasp a fishing rod, and
      an upwardly extending bracket mounted intermediate the length of the base plate and above the generally vertical leg, said bracket having a central opening for receiving a handle of the rod.

2. A fishing pole holder as in claim 1, wherein
   the means for connecting the bracket to a gunwale includes holes through the base plate and screws adapted to be inserted therethrough into the gunwale.

3. A fishing pole holder as in claim 1, wherein
   the means for connecting the bracket to a gunwale includes a top plate fitted above and surrounding the pocket, holes through the top plate and screws adapted to be inserted down through the holes in the top plate and into the top of the gunwale.

* * * * *